United States Patent

[11] 3,575,658

| [72] | Inventors | Michael I. Behr<br>South Pasadena;<br>Lewis B. Coon, Jr., Pasadena, Calif. |
|---|---|---|
| [21] | Appl. No. | 859,248 |
| [22] | Filed | Sept. 17, 1969 |
| [45] | Patented | Apr. 20, 1971 |
| [73] | Assignee | Burroughs Corporation<br>Detroit, Mich.<br>Continuation of application Ser. No.<br>600,605, Dec. 9, 1966, now abandoned. |

[54] METHOD FOR MEASURING INCREMENTAL SPEED OF TAPE TRANSPORT
27 Claims, 10 Drawing Figs.

[52] U.S. Cl. .................................................. 324/172,
179/100.2, 340/174.1
[51] Int. Cl. ...................................................... G01p 3/54
[50] Field of Search ........................................... 324/69, 70;
179/100.2; 340/174.1

[56] References Cited
UNITED STATES PATENTS

| 2,355,128 | 8/1944 | Whitlock .................... | 324/70 |
| 2,762,013 | 9/1956 | Chandler .................... | 324/70 |
| 2,827,622 | 3/1958 | Guttwein .................... | 324/70 |
| 2,828,459 | 3/1958 | Pear .......................... | 324/70 |
| 2,942,184 | 6/1960 | Sihvonen .................... | 324/70 |

FOREIGN PATENTS

| 489,038 | 1938 | Great Britain ............... | 324/70 |
| 1,159,194 | 1963 | Germany ..................... | 324/70 |

Primary Examiner—Michael J. Lynch
Attorney—Christie, Parker & Hale

ABSTRACT: A method for measuring the incremental speed of tape transport is disclosed. A first series of marks are prerecorded along the length of the tape at predetermined increments of space before measuring the speed. Then a second series of marks are recorded along the length of the tape at predetermined increments of time during tape transport. The spatial relationship along the length of tape between the two series of marks is a measure of the speed of tape transport. In one form of the method the first series of marks are recorded along the length of the tape in different channels, with the marks of the channels being staggered relative to each other. The series of prerecorded marks may be repeated along the length of the tape separated by gaps in which no marks appear. In such case, a new test run can be carried out for each series responsive to the sensing of the gaps.

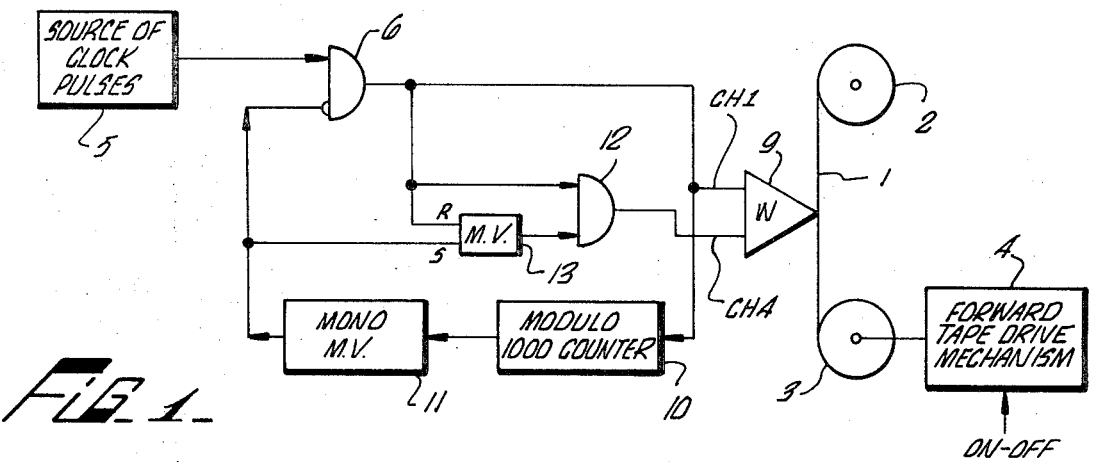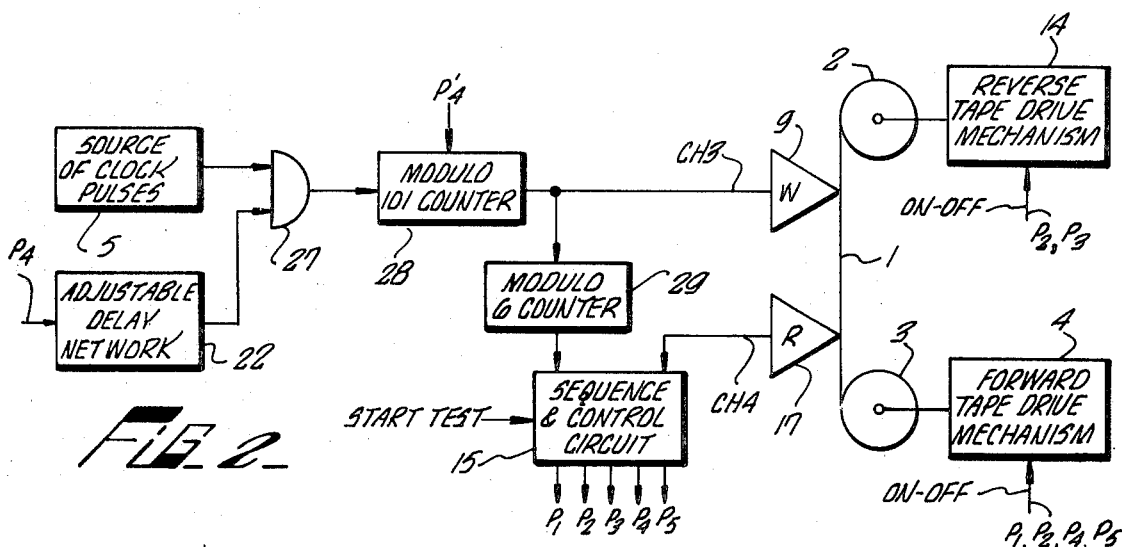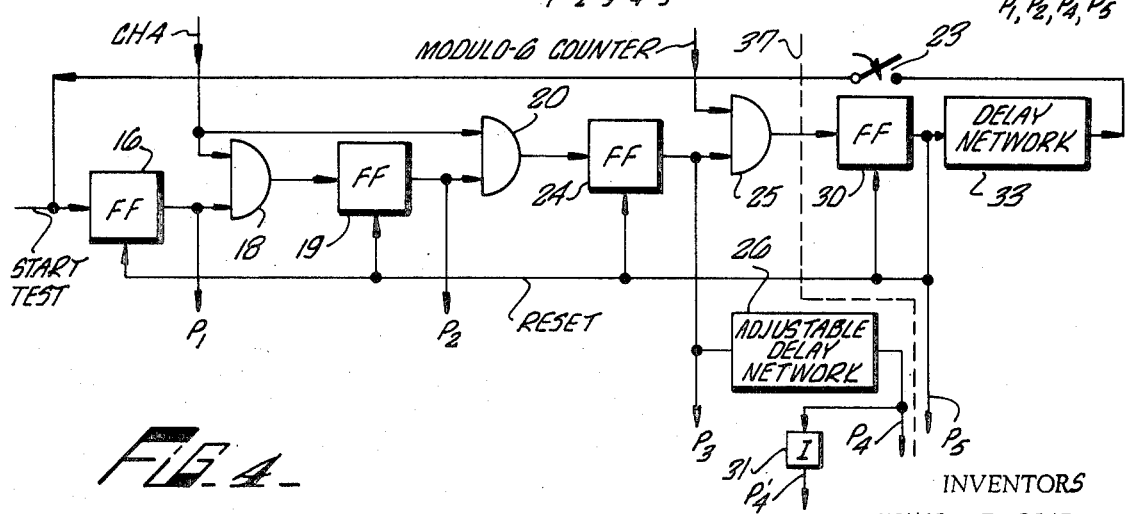

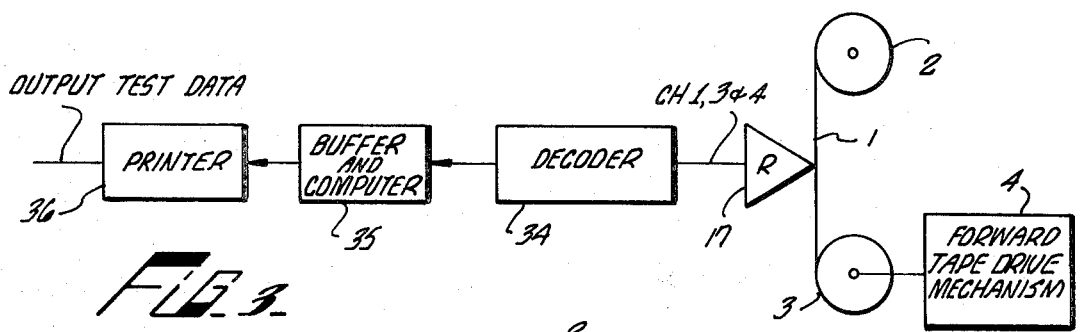
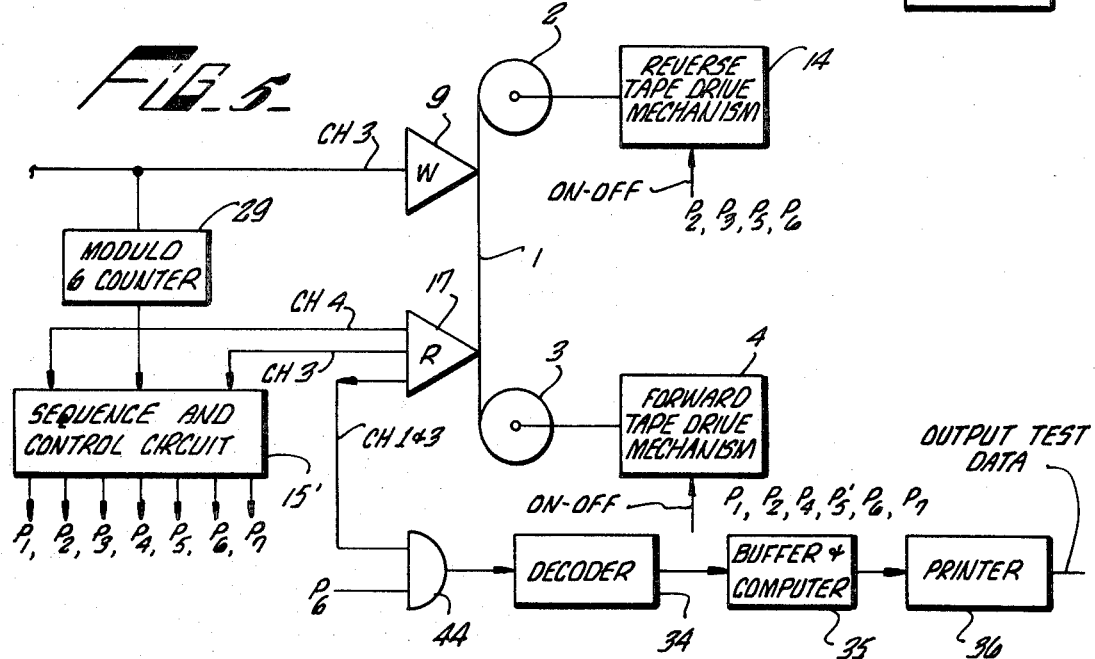
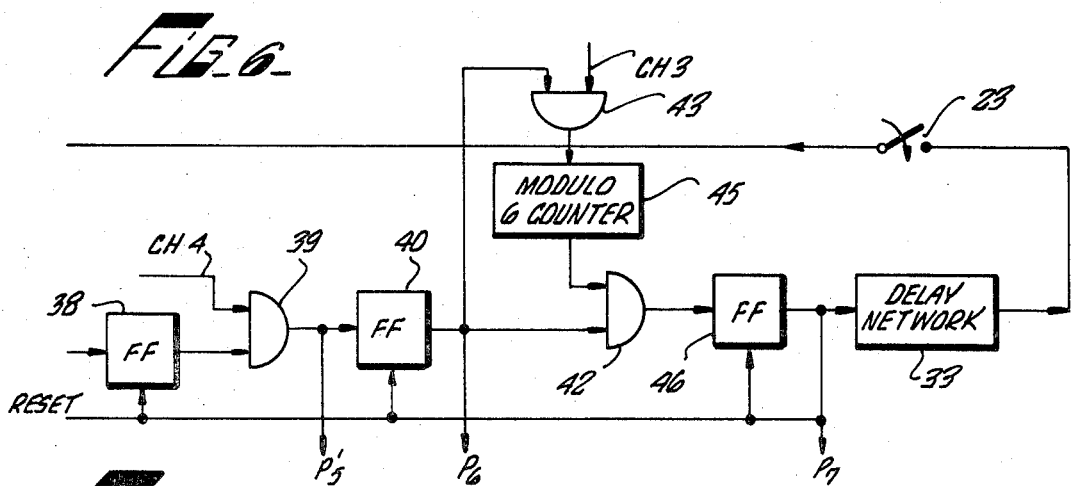
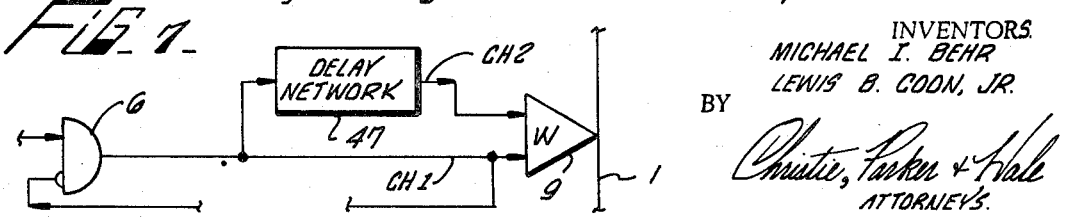

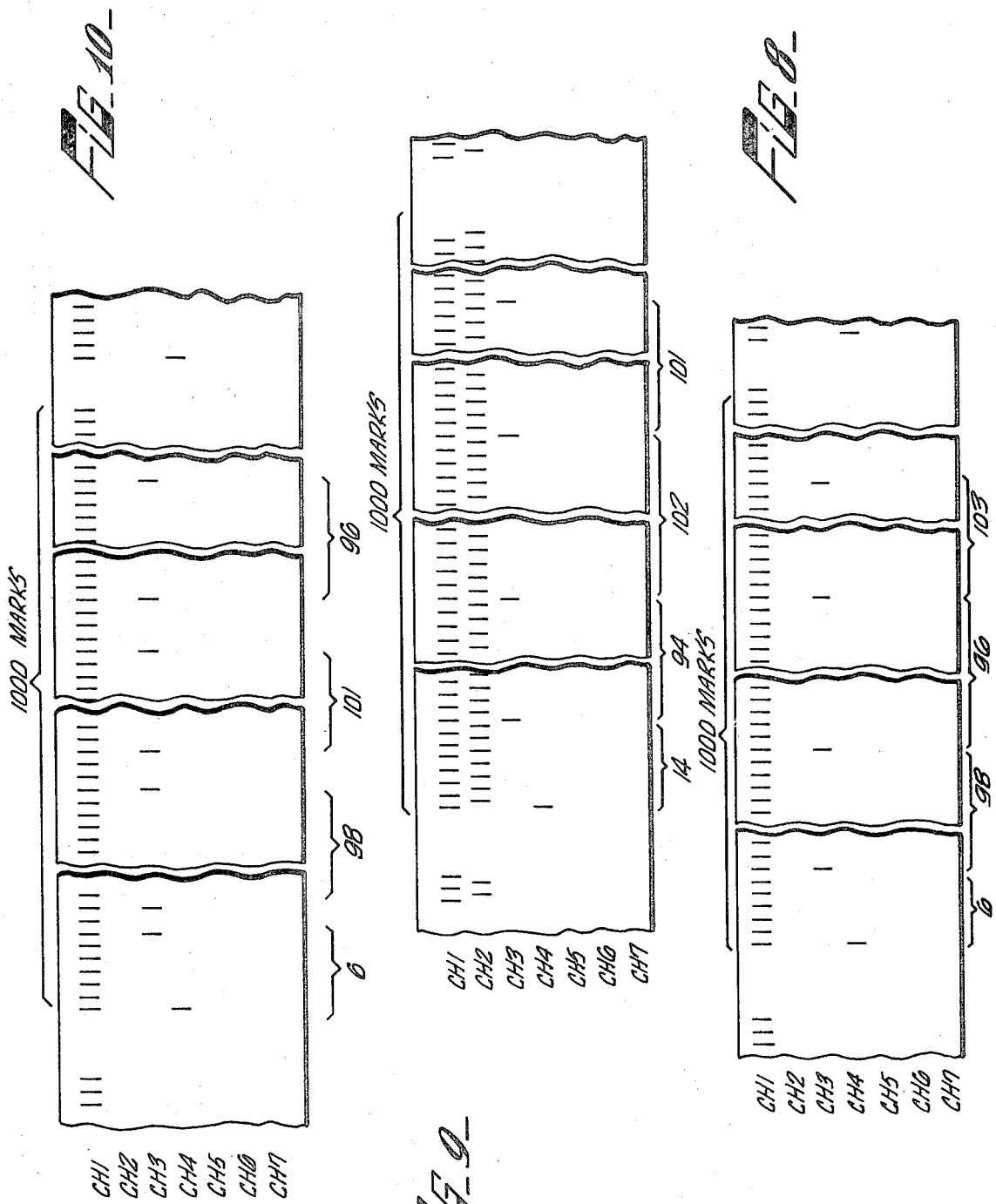

METHOD FOR MEASURING INCREMENTAL SPEED OF TAPE TRANSPORT

This application is a continuation of a copending application Ser. No. 600,605, filed Dec. 9, 1966, and now abandoned.

This invention relates to measurement of the speed of tape transport, and more particularly, to a method for measuring incremental speed of a tape during transport.

Certain characteristics of a tape and its associated tape handling equipment are reflected by the speed of tape transport, especially during acceleration of the tape toward its normal operating speed. By analyzing fluctuations in the speed of tape transport, which may often be minute and sudden, it is often possible to isolate and locate sources of erratic and faulty performance in the tape handling equipment.

To provide the accuracy required in the measurement of tape transport speed of the purpose of isolating and locating sources of faulty equipment performance, a direct, positive measurement of the speed of the tape is preferable, as distinguished from measuring, for example, the rotational speed of a capstan moving with the tape. In one arrangement that positively measures the transport speed of magnetic tape on which equally spaced magnetically recorded marks appear, the marks are read from the tape during test and are fed to the vertical deflection control input of an oscilloscope. A source of sawtooth voltage, which has a period equal to the time period that would elapse between marks when operating at some nominal transport speed, is synchronized in phase to the marks read from the tape. The sawtooth voltage serves as the horizontal deflection control input of the oscilloscope. As a result, the relative speed of tape transport in the increment between successive marks on the tape is represented by the horizontal position on the screen of the oscilloscope, at which a pulse appears responsive to the mark on the tape. This technique for measuring the speed of tape transport has several drawbacks. First, it is difficult to detect fluctuations in the tape speed that have a low frequency of occurrence, because the persistence of the screen is too small to create a visible indication. Second, measurement of the transport speed of tape requires the constant attention of a human operator during the test to observe and record the results.

In contrast, the invention contemplates measuring the speed of tape transport by prerecording a first series of marks along the length of the tape at predetermined increments of space before test and then recording a second series of marks along the length of the tape at predetermined increments of time while the tape is being transported during test. The average tape speed in the increment of time between successive marks recorded during test is represented by the spatial relationship along the length of tape between the prerecorded marks and the marks recorded during test. Usually the predetermined time increments are selected so that a large number of prerecorded marks occur between successive marks recorded during test. In particular, it is of advantage to prerecord the marks at equal increments of space along the length of the tape with such density that 100 prerecorded marks occur between successive marks recorded during test at a selected nominal speed, which is usually the normal operating speed. As a result, the number of prerecorded marks occurring between successive marks recorded during test gives the incremental tape speed directly as a percentage of the nominal speed.

By measuring the speed of tape transport in this way, a permanent record of the test results is maintained on the tape. These test results can be handled like any other type of information stored on tape. For example, they can be read off the tape and fed to a printer or other display device or transferred to another type for storage until analyzed at a later time.

According to a feature of the invention, several series of marks are prerecorded on different channels of the tape at identical predetermined increments of space, with corresponding marks being staggered a fraction of an increment relative to each other. Consequently, the density of prerecorded marks on the tape is increased without requiring them to be read from the tape at a higher clock rate. The increase in density of the prerecorded marks along the length of the tape permits marks to be recorded during test at smaller increments, thereby increasing the sensitivity of the measurement to changes in speed without sacrificing the accuracy of the incremental speed measurement.

According to another feature of the invention, the series of prerecorded marks is repeated along the length of the tape separated by gaps in which no marks appear, and the tape handling equipment under test is subjected to a new test run each time a new series of prerecorded marks begins on the tape. The test data is either read from the tape after the entire test is completed or after each test run.

These and other features of the invention are described further in the following detailed description taken in conjunction with the drawings, in which:

FIG. 1 is a schematic diagram in block form of apparatus for carrying out the step of prerecording marks at predetermined increments of space along the length of the tape to be used in the test;

FIG. 2 is a schematic diagram in block form of apparatus for carrying out the step of recording marks on the prerecorded tape at predetermined increments of time while transporting the tape with the tape handling equipment under test;

FIG. 3 is a schematic diagram in block form of apparatus for carrying out the step of reading the test data from the tape after test for the purpose of its analysis;

FIG. 4 is a schematic diagram in block form of the sequence and control circuit shown in FIG. 2;

FIG. 5 is a schematic diagram in block form of a modification of the apparatus of FIG. 2 to permit reading the test data immediately after each test run;

FIG. 6 is a circuit schematic diagram in block form of part of the sequence and control shown in FIG. 5, the remainder being illustrated in FIG. 4;

FIG. 7 is a schematic diagram in block form of a modification of the apparatus of FIG. 1 to permit staggering of several series of prerecorded pulses in different channels; and FIGS. 8, 9, and 10 are diagrams representing strips of magnetic tape each with seven channels on which marks are depicted to illustrate the principles of the invention.

Reference is now made to FIG. 1, which shows an arrangement for carrying out the step of prerecording marks on tape. A tape 1 is stored on a reel 2 and wound onto a reel 3 during transport by a forward tape drive mechanism 4. For the purposes of illustration, it is assumed that tape 1 is a standard magnetic tape with seven parallel channels stretched along its length, on which marks can be magnetically recorded. Such a tape is represented in FIG. 8. Electrical pulses from a source 5 of clock pulses are coupled through an inhibit gate 6 to a write head 9, which has seven write elements located in close proximity to the seven channels on tape 1. A series of 1,000 marks located at predetermined (preferably equal) increments of space is to be repeatedly recorded along the length of tape 1. The increment between marks is dependent upon the frequency of the clock pulses from source 5 and the speed of tape transport, which are both preferably held very constant so as to achieve equal spacing between marks. In actuality, most tape handling equipment transports tape at a very constant speed after the tape has been accelerated to normal operating speed. Thus, the repeated series of prerecorded marks are preferably all recorded on tape 1 during uninterrupted transport after the tape has reached normal operating speed. In many cases, therefore, the same tape handling equipment that is to be subjected to test can also be employed to execute the prerecording step.

In operation, forward tape drive mechanism 4 is first turned on and, after tape 1 reaches normal operating speed, source 5 is energized. Thus, clock pulses are transmitted through gate 6 to write head 9 for recordation on channel CH 1 of tape 1. For each clock pulse applied to write head 9, the state of a modulo–1,000 counter 10 is advanced by one count. After 1,000 clock pulses are applied to write head 9, counter 10 completes its cycle and triggers a monostable multivibrator 11. Multivibrator 11 generates a pulse of fixed duration, which is applied to the inhibit input of gate 6. As a result, no further clock pulses form source 5 are transmitted through gate 6 to write head 9 for a short time period until the termination of the pulse generated by monostable multivibrator 11. In this way, repeated series of 1,000 pulses separated by short gaps are prerecorded on tape 1. To mark the beginning of each series of prerecorded marks, a mark is recorded on channel CH 4 of tape 1 adjacent to the first prerecorded mark of each series, as depicted in FIG. 8. To this end, the output of gate 6 is coupled through an AND gate 12 to write head 9. Transmission through AND gate 12 is controlled by the state of a multivibrator 13. Each time a series of prerecorded pulses is completed and multivibrator 11 is triggered, the pulse generated by multivibrator 11 sets multivibrator 13, thereby enabling AND gate 12. As the clock pulse from source 5 that produces the first prerecorded mark of the next series on channel CH 1 is transmitted through gate 6, it is also transmitted through gate 12 to write head 9 and to multivibrator 13. Consequently, a mark is recorded on channel CH 4 of tape 1, multivibrator 13 is reset, and no further transmission of clock pulses through gate 12 takes place until multivibrator 13 is set again at the end of the series of prerecorded pulses.

Reference is now made to FIG. 2, in which an arrangement is shown for carrying out the step of recording marks on tape 1 at predetermined increments of time during test. In this particular arrangement, prerecorded tape 1 is accelerated by the tape handling equipment under test from standstill up to normal operating speed as a new test run during each series of prerecorded pulses. The tape handling equipment under test might include tape guides to control the position of the tape, capstans to change the direction of tape travel, vacuum columns, and other well-known tape handling appurtenances, as well as a reverse tape drive mechanism 14 and forward tape drive mechanism 4. The latter bears the same number as the corresponding element in FIG. 1 to signify that the tape handling equipment used in the prerecording step might be the tape handling equipment under test. In this case, the elements of write head 9 associated with channels CH 1 and CH 4 are disconnected so the prerecorded marks are not erased during test. Preferably the increments of time at which marks are recorded on the tape during test are equal and determined by the same source 5 of clock pulses employed to prerecord the series of marks on channel CH 1. It is particularly advantageous for the marks to be recorded on the tape during test at intervals separated by 100 clock pulses. In such case, the incremental speed of tape transport between two successive marks recorded during test is given directly in the percentage of nominal speed by the number of prerecorded marks occurring between two marks recorded during test, and the nominal speed is defined as the speed of tape transport during the prerecording step.

The testing operation is begun by closing a switch 23 in a regenerative feedback loop and applying a signal to the START TEST lead of a sequence and control circuit represented in FIG. 2 as a block 15 and shown in detail in FIG. 4. The signal applied to the START TEST lead sets a flip-flop 16. The output of flip-flop 16, which is coupled by a lead $P_1$ to the ON-OFF lead of forward tape drive mechanism 4, is thereby energized. As a result, tape 1 is transported in a forward direction until a read head 17 encounters a mark on channel CH 4 of tape 1, which indicates the beginning of a series of prerecorded marks on channel CH 1. When flip-flop 16 is set, its output also enables an AND gate 18. Responsive to the mark on channel CH 4, a pulse is generated at the output of read head 17, which is transmitted through AND gate 18 and sets a flip-flop 19. The output of flip-flop 19 is connected to one input of an AND gate 20 and by a lead $P_2$ to forward tape drive mechanism 4 and to reverse tape drive mechanism 14. When flip-flop 19 is set, forward motion of tape 1 is therefore stopped, slow reverse motion of tape 1 is initiated, and AND gate 20 is enabled. Tape 1 is slowly reversed until read head 17 encounters the mark in channel CH 4 once again, at which time a pulse generated at the output of read head 17 is transmitted through AND gate 20 to set a flip-flop 24. When flip-flop 24 is set, its output, which is connected by a lead $P_3$ to reverse tape drive mechanism 14, is energized. As a result, reverse motion of tape 1 is stopped with the mark on channel CH 4 precisely located with respect to write head 9. A lead $P_4$ having an adjustable delay network 26 in its path connects the output of flip-flop 24 to forward tape drive mechanism 4. Thus, an adjustable predetermined time after flip-flop 24 is set and tape 1, moving in the reverse direction, comes to rest, lead $P_4$ becomes energized and forward tape drive mechanism 4 begins to transport tape 1 in a forward direction to carry out a test run.

Lead $P_4$ is also connected through an adjustable delay network 22 to the input of an AND gate 27 (FIG. 2) to which clock pulses from source 5 are applied. When lead $P_4$ is energized, forward tape transport begins. An adjustable predetermined time thereafter, AND gate 27 is enabled and clock pulses from source 5 are transmitted through gate 27 to the input of a modulo–101 counter 28. The delay introduced by network 22, which is in the order of 5 milliseconds, enables the tape to start moving before marks are recorded so the marks are distinguishable from each other. Each clock pulse advances the state of counter 28 by one count. Counter 28 is designed to produce a pulse at its output after its state is advanced by the first clock pulse transmitted through gate 27 and after each subsequent 101 clock pulses transitted through AND gate 27. The pulses generated at the output of counter 28 are applied to write head 9, which simultaneously records marks on channel CH 3.

The number of prerecorded marks in channel CH 1 that precede the first mark on channel CH 3, hereafter called the index, is a function of the time interval during which tape 1 is at rest between reverse tape travel and forward tape travel for the test run and the time interval between the start of forward tape transport and recording. The variations of this index as a function of these intervals reflect the characteristics of the tape handling equipment and tape 1 itself. Thus, by changing the delays introduced by adjustable delay networks 22 and 26, different index values are obtained, which may be helpful in analyzing the performance of the tape handling equipment under test and its relationship with a particular tape being handled during the test. This delay is in the order of milliseconds.

The marks recorded on channel CH 3 of tape 1 responsive to the output of counter 28 are spaced at equal intervals of time along the length of tape 1. If the average tape speed in the increment between two successive marks on channel CH 3 is exactly equal to the speed of tape transport during the prerecording step, exactly 100 prerecorded marks appear between the two marks on channel CH 3, since the same source of clock pulses controls both the prerecording step and the recording step during test. Thus, if the speed of tape transport during the prerecording step is designated the nominal transport speed, the number of marks in channel CH 1 between successive marks on channel CH 3 is a direct measurement of the incremental speed of tape transport during test in percentage of nominal speed. FIG. 8 represents a portion of tape 1 with four marks recorded at predetermined intervals during test. For the test run shown there, the index is six and the first, second, and third interval speeds are, respectively, 98 percent, 96 percent, and 103 percent of nominal speed.

The marks recorded on channel CH 3 during each series of 1,000 prerecorded marks should not be so numerous as to extend beyond the series of prerecorded marks. On the other hand, the marks recorded on channel CH 3 should not be so few as to fail to cover completely the time during which the tape is accelerating from standstill up to its normal operating speed. In a typical case, six marks are recorded on channel CH 3 during a test run through one series of prerecorded marks. AS tape 1 moves forward during test, the marks recorded on channel CH 3 are counted by a modulo–6 counter 29 connected to the output of counter 28. An AND gate 25 (FIG. 4) is enabled when flip-flop 24 is set. After counter 29 completes a cycle, indicating that six marks have been recorded on channel CH 3, the output of counter 29, which is connected to the input of AND gate 25 (FIG. 4), becomes energized. As a result, a flip-flop 30 is set and its output, which is connected by a lead $P_5$ to forward tape drive mechanism 4, is energized to stop forward travel of tape 1. At this point, a test run through one series of prerecorded pulses is complete. The output of flip-flop 30 is also connected to a RESET lead and to the input of a delay network 33. When flip-flop 30 is set, the RESET lead is energized and flip-flops 16, 19, 24, and 30 are reset in preparation for the next test run. Shortly after flip-flop 24 is reset, the output of adjustable delay network 26 becomes deenergized and the output of an inverter 31, which is coupled by a lead $P_4'$ to the RESET lead of counter 28 (FIG. 2), is energized. Thus, counter 28 is reset. Delay network 33 is connected in the regenerative feedback loop between the output and the input of the sequence and control circuit. Thus, a short time after flip-flop 30 is set, the START TEST lead becomes reenergized and the described sequence is repeated in connection with the next series of prerecorded marks. A test run is accordingly executed on each series of prerecorded marks in turn until either switch 23 is opened or the end of tape 1 is reached. The delay introduced by network 33 should be sufficient to insure that counter 28 is reset before a new test run begins.

FIG. 3 shows an arrangement for carrying out the step of reading and reorganizing the test data produced during the test runs carried out by the arrangement of FIG. 2. Tape 1 is transported by forward tape drive mechanism 4 until its whole length, or at least the length involved in the test, has been sensed by read head 17. Tape drive mechanism 4 is employed in this arrangement to signify that the tape handling equipment used could be that used to carry out the previous step. The speed of tape transport during this step, however, is immaterial. A decoder 34, a buffer and computer 35, and a printer 36 are connected in tandem to process the test data sensed by read head 17. For the purpose of illustration, it is assumed that the channels on tape 1 each represent different denominational orders of binary numbers corresponding to the channel number, i.e., channel CH 1 is the first denominational order and channel CH 3 is the third denominational order. Decoder 34 converts each binary number formed by the marks recorded in a row transverse to the length of tape 1 to a corresponding decimal number. Thus, at the beginning of each series of prerecorded marks, also designating the beginning of a test run, the decimal number "9" is represented at the output of decoder 34, since marks are then recorded on channels CH 1 and CH 4. Thereafter, a group of decimal number 1's are represented at the output of decoder 34 until the first mark made on channel CH 3 of tape 1 during test. At that time, decimal number 5 is represented at the output of decoder 34. For the exemplary tape marking in FIG. 8, six decimal number 1'"s are represented at the output of decoder 34 between the decimal number 9 and the decimal number 5. This represents the index of a particular test run. Next, 98 decimal number 1's are represented at the output of decoder 34, followed by 96 decimal number 1's, and so forth through the test run. The data for each test run in turn is represented at the output of decoder 34 as tape 1 is transported by read head 17. Buffer and computer 35 could temporarily store the decimal numbers represented at the output of decoder 34 and gradually feed them serially to printer 36 at the rate of which it can accommodate information. Printer 35 would produce this information in visible form for analysis by a human operator. Alternatively, buffer and computer 35 could rearrange the form of the data, giving the index of each run and the number of prerecorded marks between successive marks on channel CH 3 in terms of a single number, e.g., index 6, first increment 98, second increment 96, third increment 103. Buffer and computer 35 could also include a second magnetic tape to store the test data for processing at a later time.

As a modification of the step performed by the arrangements of FIGS. 2 and 4, an arrangement is shown in FIG. 5 which reads the test data after each test run on tape 1. This is to be distinguished from the step of first recording test data over the whole length of tape 1 and then reading all the test data at one time. The modified operation is carried out by a sequence and control circuit 15' (FIG. 5), which is made up of the circuitry on the left-hand side of a dashed line 37 in FIG. 4 connected to the circuitry shown in FIG. 6. Circuit 15' functions as described in connection with the circuitry in FIG. 4 up until the time that AND gate 25 (FIG. 4) becomes energized, i.e. after all the marks have been recorded in a test run. In circuit 15', and AND gate 25 sets a flip-flop 38 (FIG. 6) when it becomes energized. As a result, the output of flip-flop 38, which is coupled by a lead $P_5'$ to forward tape drive mechanism 4 and reverse tape drive mechanism 14, is energized. This stops forward tape travel and initiates reverse tape travel. Tape 1 continues to travel in the reverse direction until the mark on channel CH 4 that designates the beginning of the series of prerecorded marks is sensed by read head 17. A pulse generated at the output of read head 17 responsive to this mark is transmitted through an AND gate 39, which is first enabled by the output of flip-flop 38 when it is set. At this point, flip-flop 40 is set, and its output, which is connected by a lead $P_6$ to reverse tape drive mechanism 14 and forward tape drive mechanism 4, is energized. As a result, reverse tape travel stops and forward tape travel starts again. When flip-flop 40 is set, AND gates 42, 43, and 44 (FIG. 5) are enabled. As tape 1 travels in the forward direction, the marks on channels CH 1 and CH 3 are sensed by read head 17 and coupled through AND gate 44 to decoder 34, buffer and computer 35, and printer 36 in tandem to operate as described in connection with FIG. 3. The marks recorded on channel CH 3 during test are also coupled through AND gate 43 to a modulo–6 counter 45. After six marks on channel CH 3 are detected, the output of counter 45, which is coupled through AND gate 42 to the input of a flip-flop 46, becomes energized. Flip-flop 46 is therefore set and its output, which is connected by a lead $P_7$ to forward tape drive mechanism 4, is energized. This stops forward tape drive travel. In addition, flip-flop 46 performs the same functions as flip-flop 30 in FIG. 4. As the output of flip-flop 46 becomes energized, flip-flops 38, 40, and 46, as well as flip-flops 16, 19, and 24, become reset. The input of delay network 33 is also energized. After a short delay, network 33 provides a START TEST signal at the input of the sequence and control circuit. Thus the sequence is repeated.

The accuracy of measurement of incremental tape speed according to the invention is directly related to the number of prerecorded marks nominally appearing between successive marks recorded during test, since the measurement is discrete in nature. The measurement is always subject to plus or minus one count at either end of the group of prerecorded marks between successive marks recorded during test. Thus, with 100 prerecorded marks nominally appearing between successive marks recorded during test, an overall accuracy of plus or minus 2 percent results (disregarding error in the spacing of prerecorded marks). The sensitivity of measurement to changes in tape speed is, however, inversely related to the increment over which the speed is measured, since the speed measurement is only an average value taken over the increment. Thus, to increase sensitivity without impairing accuracy, the number of prerecorded marks per unit length on channel CH 1 must be increased. This would require the character gate used to read the binary information on the tape to operate at a proportionately higher speed. The speed of operation of the character gate, however, is limited by practical considerations. According to a feature of the invention, the sensitivity of measurement of the tape speed is improved two or more fold without increasing the number of prerecorded marks per unit length in any one channel on tape 1 by staggering prerecorded marks on several channels with respect to each other. This is illustrated in FIG. 9, wherein marks are prerecorded on channel CH 1 and marks are prerecorded on channel CH 2. The prerecorded marks on channel CH 2 are located substantially halfway between the respective marks on channel CH 1. To produce staggered prerecorded marks on channels 1 and 2, the arrangement of FIG. 1 is modified, as illustrated in FIG. 7, by connecting the output of inhibit gate 6 to the element of write head 9 associated with channel CH 2 through a delay network 47. Otherwise, the arrangement is identical to that of FIG. 1. Delay network 47 introduces a time delay equal to one-half of the period of the clock pulses from source 5 minus a small constant determined by the skew alignment during transport. The arrangement of FIG. 2 for recording marks during test is then modified by employing a modulo–51 counter instead of a modulo–101 counter. In reading the test data, the elements of read head 17 corresponding to channels CH 1 and CH 2 are coupled to decoder 34 (FIG. 3 or FIG. 5). The character gate is operated to sample channel CH 2 at time intervals delayed in time from the intervals at which channel CH 1 is sampled an amount equal to the time delay of network 47 (FIG. 7). At the output of decoder 34, the decimal numbers 1 and 2 alternately are represented, with either a decimal number 5 or a decimal number 6 being represented, when a mark recorded during test is sensed by read head 17. Thus, the increment in which the tape speed is measured is cut in half without impairing the accuracy of the measurement. This principle could, of course, also be applied to stagger prerecorded marks in three or more channels in order to further decrease the increment.

FIG. 10 illustrates a technique for recording marks during test to permit separate identification of the measured increments within a series of prerecorded marks. Between the marks on channel CH 3 designating the index number and the start of the first increment lies one prerecorded mark. Between the mark on channel CH 3 designating the end of the first measured increment and the mark designating the beginning of the second measured increment, two prerecorded marks lie on channel CH 1. Similarly, before each measured increment, an increased number of prerecorded marks occur after the mark designating the end of the last measured increment. The arrangement of FIG. 2 could be appropriately modified to provide such a pattern of marks.

Although in the exemplary embodiment of the invention the steps of the method are carried out by specific arrangements of apparatus, the method could similarly be performed by use of a computer. In this regard, it is particularly advantageous to employ the method to measure the tape transport speed of the computer tape handling equipment without aid of external apparatus by utilizing the programmability of the computer. Similarly, it might be desirable under some circumstances to carry out some of the steps of the method by hand. It would probably not prove practical to carry out any of the steps of the method by hand to measure the incremental speed of magnetic tape during transport. However, the invention has general applicability in measuring the incremental speed of transport of any type of tape, i.e., any type of elongated material during transport parallel to its length. Thus, the method could be useful to measure the speed of transport of roll film or punched paper tape. In such cases, it might be desirable to place the prerecorded marks on the tape or film manually and to determine the distance between the prerecorded marks by a direct physical measurement. Similarly, the test data could be read from the tape by a human being after the test is completed. The step of recording marks during test would most likely be performed by machine in all cases, because the time increments between successive marks during test should be precisely determined.

The operation of flip-flops of FIGS. 4 and 6 may be synchronized to the clock pulses from source 5 if desired to provide better control over the sequencing operation.

We claim:

1. A method for measuring tape speed during transport by tape handling equipment of the type having means for recording and reading marks on the tape in a plurality of channels along the length of the tape, the method comprising the steps of:

recording a first series of marks in one channel of the tape at predetermined increments of space along its length during transport of the tape;

recording next to the first series of marks a second series of marks in another channel of the tape at predetermined increments of time during transport by the tape handling equipment under test;

reading the first series of marks and the second series of marks on the tape together during transport of the tape;

producing responsive to the reading of the first and second series of marks a series of character signals that depend upon the adjacent presence and absence of marks in the plurality of channels at spaced points along the length of the tape, there being a unique character signal for each combination of presence and absence of marks in the channels; and storing the character signals.

2. The method claim 1, in which the marks of the first series are placed on the tape at equidistantly spaced increments and the marks of the second series are placed on the tape at equal increments of time such that a plurality of marks of the first series occur between successive marks of the second series during tape transport at a selected nominal speed.

3. The method of claim 2, in which 100 marks of the first series occur between successive marks of the second series during tape transport at the selected nominal speed.

4. The method of claim 1, in which the marks of the first series are placed on the tape at equidistantly spaced increments under control of clock pulses separated by constant time increments while the tape is being transported at a constant speed and the marks of the second series are placed on the tape under control of clock pulses separated by the same time increments.

5. The method of claim 4, in which the marks of the first series are placed on the tape responsive to the occurrence of every clock pulse and the marks of the second series are thereafter placed on the tape responsive to the occurrence of every 100 first clock pulse.

6. The method of claim 1, in which the step of recording a first series of marks repeats the first series of marks on the tape at intervals along its length, the repetitions being separated by starting marks on the tape that are distinguishable from the other marks on the tape, and the step of recording a second series of marks places the second series of marks on the tape during repetitive test runs by the tape handling equipment each initiated in response to one of the starting marks, the tape accelerating during each test run from standstill at a predetermined point relative to the starting mark up to nominal operating speed.

7. The method of claim 6, in which the relationship between each first series and the corresponding second series is sensed before the following test run for the next repetition of the first series.

8. The method of claim 6, in which the relationship between the repetitions of the first series and the corresponding second series are sensed after the test runs for a plurality of repetitions of the first series.

9. The method of claim 6, in which the tape remains at standstill a predetermined time before acceleration pursuant to a test run.

10. The method of claim 9, in which the predetermined time is varied from test run to test run.

11. The method of claim 1, in which the tape is divided into areas arranged in rows transverse to the length of the tape and columns parallel to the length of the tape, each row designating a binary number the value of which is dependent upon the presence or absence of a mark in the areas of the row and each column designating a denominational order of the binary numbers, the first series of marks is placed in one column and the second series of marks is placed in another column, and the spatial relationship between the first and second series of marks is sensed by decoding the binary numbers in the rows.

12. The method of claim 1, in which the first series of marks on the tape is arranged in a plurality of staggered columns along the length of the tape.

13. The method of claim 1, in which the first series of marks on the tape is arranged in a plurality of columns parallel to the length of the tape, corresponding marks of the columns being equidistantly spaced from each other along the length of the tape.

14. The method of claim 1, in which the tape is divided into areas arranged in rows transverse to the length of the tape and columns parallel to the length of the tape, each row designating a binary number the value of which is dependent upon the presence or absence of a mark in the areas of the row and each column designating a denominational order of the binary numbers;

the first series is repeated along the length of the tape;
the marks of the first series are placed in a plurality of columns and staggered with respect to each other;
the marks of the second series are placed in another column;
the marks of the first series are placed on the tape at equidistantly spaced increments under control of clock pulses separated by constant time increments while the tape is being transported at a constant speed;
the repetitions of the first series of marks are separated by starting marks on the tape;
the marks of the second series are placed on the tape during repetitive test runs by the tape handling equipment under test each initiated in response to one of the starting marks, the tape accelerating during each test run from standstill at a predetermined location relative to the discernible indication up to normal operating speed;
the marks of the second series are placed on the tape during each test run responsive to the occurrence of every 100 first clock pulse;
the tape remains at standstill for a predetermined time before acceleration pursuant to a test run, the predetermined time being varied from test run to test run; and
the spatial relationship between the first and second series of marks is sensed by decoding the binary numbers in the rows.

15. The method of claim 1, comprising the additional step of recording a third series of marks in a third channel of the tape at predetermined increments of space along the length of tape during transport of the tape prior to recording the second series of marks, the marks of the third series being recorded next to and staggered with respect to the marks of the first series.

16. The method of claim 6, in which the second series of marks is started a predetermined time after acceleration pursuant to a test run.

17. The method of claim 16, in which the predetermined time is varied from run to test run.

18. The method of claim 1, in which the first series of marks are placed in the one channel of the tape with the recording and reading equipment of the tape handling means under test at predetermined increments of time during transport by the tape handling equipment under test at nominal operating speed.

19. The method of claim 18, in which the first and second series of marks on the tape are read together with the recording and reading means of the tape handling equipment under test.

20. A method for measuring the transport speed characteristics of tape handling equipment with an ON-OFF control that drives the tape at a continuously accelerating speed up to a constant normal operating speed after the equipment is turned ON, the method comprising the steps of:

loading into the equipment a tape having a first series of prerecorded marks located at predetermined increments of space along its length up to its normal operating speed;
turning the equipment ON and recording a second series of marks along the length of tape adjacent to the prerecorded marks at predetermined increments of time from the instant of time the equipment is turned ON until the time the equipment is driving the tape at the normal operating speed;
reading the first and second series of marks on the tape concurrently during transport of the tape by tape handling equipment; and counting the number of marks of one series occurring on the tape between adjacent marks of the other series.

21. The method of claim 20, in which the prerecorded marks are located at equal increments of space along the length of tape and the marks recorded during tape transport are recorded at equal increments of time.

22. The method of claim 20, in which the tape is maintained at standstill for a predetermined time before transporting the tape.

23. The method of claim 22, in which the predetermined time is varied during measurement.

24. A method for measuring the speed of magnetic tape during transport by tape handling equipment of the type having means for recording and reading magnetic marks on the tape in a plurality of channels along the length of the tape and decoding means responsive to the recording and reading means for generating character signals depending upon the adjacent presence and absence of magnetic marks in the plurality of channels at different points along the length of the tape, the decoding means generating a different character signal for each combination of presence and absence of marks in the channels, the method comprising the steps of:

placing a first series of marks in one channel of the tape with recording and reading means of tape handling equipment at predetermined increments of space along its length during transport;
placing next to the first series of marks a second series of marks in another channel of the tape with the recording and reading means of the tape handling equipment under test at predetermined increments of time during transport by the tape handling equipment under test;
reading the first series of marks and the second series of marks on the tape together with recording and reading means of tape handling equipment during transport;
decoding with the decoding means the first series of marks and the second series of marks read from the tape; and
storing the character signals generated by the decoding means.

25. A method for measuring the speed of magnetic tape during transport by tape handling equipment having means for recording and reading magnetic marks on the tape in a plurality of channels along the length of the tape and decoding means responsive to the recording and reading means for generating character signals depending upon the adjacent presence and absence of magnetic marks in the plurality of channels at different points along the length of the tape, the decoding means generating a different character signal for each combination of presence and absence of marks in the channels, the method comprising the steps of:

placing a first series of marks in one channel of the tape with the recording and reading means of predetermined increments of space along its length during transport by the tape handling equipment under test at nominal operating speed;
placing next to the first series of marks a second series of marks in another channel of the tape with the recording and reading means at predetermined increments of time during transport by the tape handling equipment under test;
sensing the spatial relationship between the first series of marks and the second series of marks on the tape together with the recording and reading means during transport by the tape handling equipment under test;

decoding with the decoding means the first series of marks and the second series of marks read from the tape; and storing the character signals generated by the decoding means.

26. A method for measuring tape speed during transport by tape handling equipment having a recording head and a tape drive mechanism with an ON-OFF control, the mechanism transporting tape up to a normal operating speed that is constant after the mechanism is turned ON, the method comprising the steps of:

turning the mechanism ON and placing a first series of marks on the tape with the recording head at predetermined increments of time during transport of the tape by the tape handling equipment under test after the normal operating speed is reached;

turning the mechanism ON and placing a second series of marks on the tape adjacent to the first series of marks with the recording head at predetermined increments of time during transport of the tape by the tape handling equipment under test before the normal operating speed is reached;

reading the first series of marks and the second series of marks on the tape concurrently with the read head during transport of the tape by the tape handling equipment under test to ascertain the spatial relationships therebetween; and deriving from said spatial relationships a measure of the speed of the tape.

27. A method for measuring tape speed during transport by tape handling equipment having a reading and writing capability, the method comprising the steps of:

writing a first series of marks on the tape at predetermined increments of time along its length during transport of the tape by the tape handling equipment under test at a normal operating speed that is substantially constant;

writing a second series of marks on a different portion of the tape than the first series of marks at predetermined increments of time during tape transport by the tape handling equipment under test at a speed that is continuously accelerating toward the normal operating speed;

reading the first and second series of marks concurrently to ascertain the spatial relationships therebetween; and deriving from said spatial relationships a measure of the speed of the tape.